(12) United States Patent  (10) Patent No.: US 7,860,233 B2
Kaundinya et al.  (45) Date of Patent: Dec. 28, 2010

(54) SYSTEM AND METHOD FOR TRACKING ALERTS

(75) Inventors: Muthukumar G. Kaundinya, San Francisco, CA (US); Edward Wang, San Francisco, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 1259 days.

(21) Appl. No.: 11/436,449

(22) Filed: May 18, 2006

(65) Prior Publication Data

US 2007/0139212 A1    Jun. 21, 2007

Related U.S. Application Data

(60) Provisional application No. 60/752,487, filed on Dec. 20, 2005, provisional application No. 60/757,853, filed on Jan. 9, 2006.

(51) Int. Cl.
*H04M 3/00* (2006.01)
*H04M 5/00* (2006.01)
*H04M 3/42* (2006.01)

(52) U.S. Cl. ............ 379/265.05; 379/215.01; 379/265.01; 379/265.03; 379/266.06

(58) Field of Classification Search ............ 379/215, 379/88.12, 215.01, 265.05, 265.06, 265.01, 379/265.03, 266.02, 266.01, 266.06; 707/10
See application file for complete search history.

(56) References Cited

U.S. PATENT DOCUMENTS

| | | | |
|---|---|---|---|
| 6,712,702 B2 | 3/2004 | Goldberg et al. | 463/42 |
| 7,613,281 B2 * | 11/2009 | Singhai et al. | 379/88.12 |
| 2003/0033179 A1 | 2/2003 | Katz et al. | 705/7 |
| 2004/0064368 A1 | 4/2004 | Koser et al. | 705/14 |
| 2005/0150951 A1 | 7/2005 | Sacco et al. | 235/385 |
| 2007/0136303 A1 * | 6/2007 | Singhai et al. | 707/10 |

* cited by examiner

*Primary Examiner*—Thjuan K Addy
(74) *Attorney, Agent, or Firm*—Townsend and Townsend and Crew, LLP (57) ABSTRACT

A method and apparatus for generating alerts which prompt a customer representative to initiate communications with a customer relative to the alert. Further provided is a tracking template which is provided to the customer representative, whereby the customer representative can easily provide an input through the tracking template which quickly identifies an action status relative to a given alert. A plurality of different types of alerts can be generated, and these different alerts can be given different priority levels corresponding to different levels of escalation within a management structure for an organization.

22 Claims, 9 Drawing Sheets

Sales Alerts Summary for Selected FC

| FC | Action Taken Status | # of Alerts Cash Conectration | Concentrated Position | Large Deposit | Low Grade Mutual Funds | Mutual Funds Suggestion | SER Downgrade | Sudden Liquidation | Trading Threshold | Under-Performing Portfolio | Large TOA In | Large Withdrawal | Large TOA Out | # of Alerts |
|---|---|---|---|---|---|---|---|---|---|---|---|---|---|---|
| 3BJT | No Action Taken | 3 | 1 | | | | | | | | | | | 4 |
| | Attempting | 6 | 9 | 1 | 5 | 7 | 5 | 1 | 2 | 5 | | | | 41 |
| | In Progress | 2 | 2 | | | 1 | 1 | | | 1 | 2 | | | 9 |
| | Closed - Cancelled | 4 | | | | | | | | | | | | 6 |
| | Closed - Unsuccessful Attempt | 3 | 3 | | 1 | | 3 | 1 | 1 | 3 | | 4 | | 18 |
| | Closed - No Further Action Required | 29 | 27 | 15 | 1 | 14 | 74 | 3 | 13 | 32 | 5 | 29 | 11 | 253 |
| | Closed - Opportunity Created | 1 | 1 | 1 | | 3 | 2 | | 1 | 3 | | | | 12 |
| | Expired | | 2 | | | | 2 | | 1 | | | 1 | | 66 |
| | Grand Total | 48 | 45 | 17 | 6 | 25 | 88 | 5 | 18 | 45 | 7 | 34 | 11 | 349 |

Selected FC Alert List

| FC | HH Name | MARS HH Link | Create Date | Alert Type | Alert Detail | Action Taken Status | Action Taken Date |
|---|---|---|---|---|---|---|---|
| 3BJT | GROUP:230805620 | 000 | 08/15/2005 | Cash Concentration | 78% in cash with HH EQ of $271,935 | No Action Taken | 08/15/2005 |
| 3BJT | GROUP:477684316 | 000 | 08/08/2005 | Cash Concentration | 100% in cash with HH EQ of $935,042 | No Action Taken | 08/15/2005 |
| 3BJT | GROUP:686005537 | 000 | 08/15/2005 | Cash Concentration | 94% in cash with HH EQ of $454,544 | No Action Taken | 08/15/2005 |

SYSTEM AND METHOD FOR TRACKING ALERTS

RELATED APPLICATIONS

The present application claims benefit from U.S. Provisional Patent Application Ser. No. 60/752,487, filed Dec. 20, 2005, entitled SYSTEM AND METHOD FOR TRACKING ALERTS, which is incorporated herein by reference, and the present application claims benefit from U.S. Provisional Patent Application Ser. No. 60/757,853, filed Jan. 9, 2006, entitled SYSTEM AND METHOD FOR TRACKING ALERTS, which is incorporated herein by reference.

FIELD OF THE INVENTION

The present invention relates to a system and method of providing for the generation, and management of alerts which can be utilized by customer representatives, and which provides for tracking the customer representatives activities in connection with the generated alerts.

BACKGROUND

For large organizations it can be difficult to implement systems that have the ability to quickly and efficiently utilize crucial client or customer information that could help customer representatives of such organizations identify potential opportunities to cross-sell and deepen client relationships. Financial institutions are an example of one type of organization where the ability to track and utilize customer information, customer activity, and customer account information, can provide many opportunities to enhance and broaden the relationship between the financial institution and the customer.

In the context of the discussion herein it is helpful to keep in mind that a wide range of different types of data can provide useful information that can provide trigger points for initiating some type of beneficial contact with a customer. In the broadest terms any such information can be referred to herein as customer information. However, customer information can include a wide range of different types of information. One type of customer information is customer account information. Customer account information can include an identification of all accounts in which a customer has an interest. In the context of a financial institution, these accounts could include brokerage accounts, bank accounts, loans, 401(k) accounts, IRA accounts, and a myriad of other possible types of financial accounts. The customer account data can also include an identification of financial goals and purposes associated with a particular financial account. For example, one brokerage account might be provide for long term growth, while another financial account might be for short term capital preservation.

Another type of customer information is customer personal information. This information could include information such a customer's age, customer's financial expertise, and a record of a customer personal events, such a birthdates, number of children, or grandchildren, and different milestone events, such as graduations, marriages, anniversaries, births etc.

It has been recognized that quick access to the right client data can provide customer representatives within a financial institution with insights into client needs, and acting upon such information can result in improved financial performance for the customer, and improved revenue generation for the financial institution.

Some prior systems have previously been implemented which provide for analyzing customer information, and based on the customer information generating alerts which can be utilized by employees of the organization as a basis for initiating contact with a customer. However, some such prior systems have lacked, among other things, the ability to efficiently and effectively track the utilization of such alerts.

BRIEF DESCRIPTION OF THE DRAWINGS

FIG. 4 illustrates an embodiment of a method of the present invention.

FIG. 6 illustrates an embodiment of a selected customer representative alert summary page of an embodiment of the invention.

DETAILED DESCRIPTION

An embodiment of a system and method herein, provide an alert generation module which operates to analyze customer data, and based on the analysis generate alerts which are provided to customer representative. In response to receiving an alert the customer representative can take a follow up action, and this follow up action can be tracked using a tracking template. These elements of an embodiment of the invention will be discussed more fully below.

Figure 1:
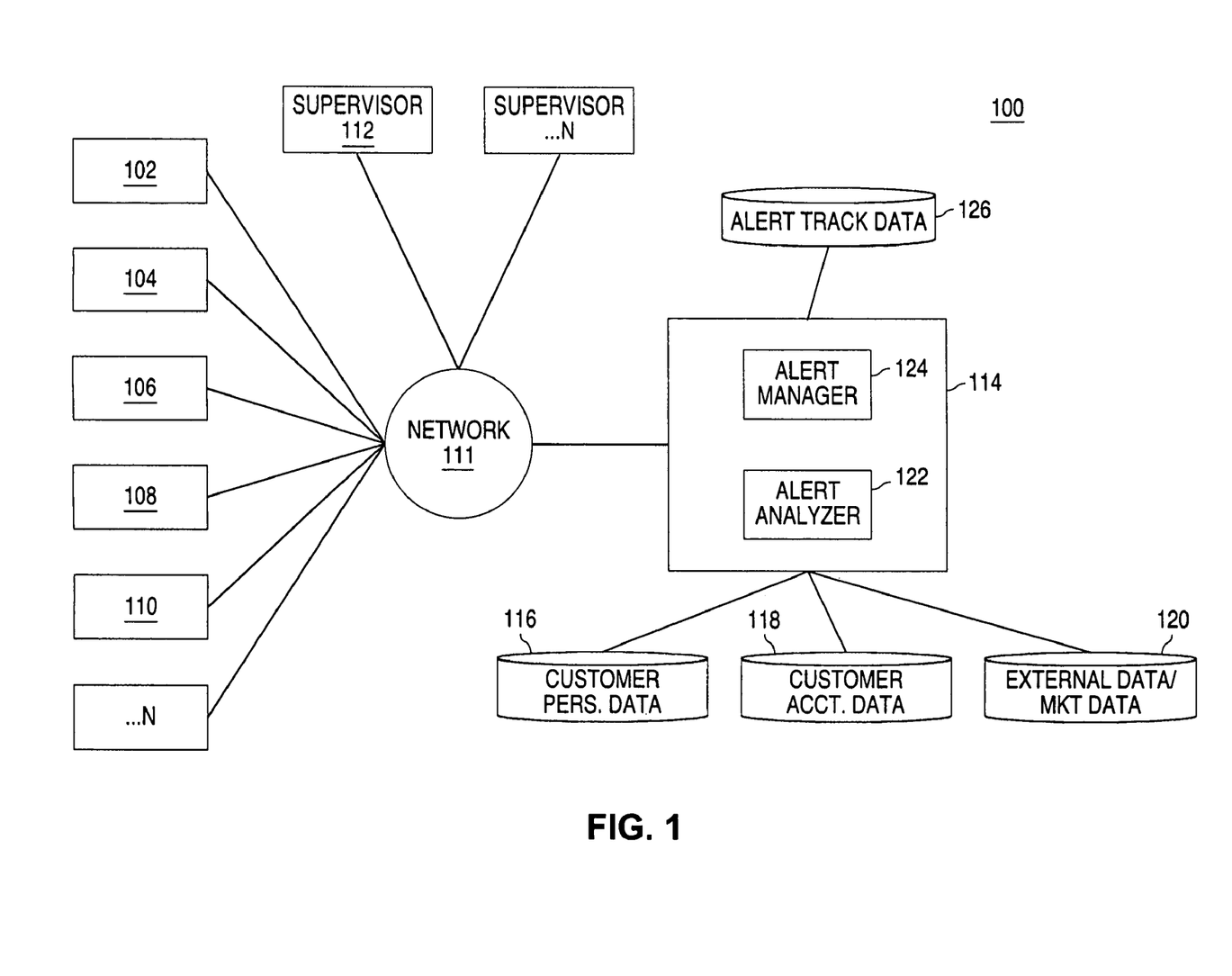
FIG. 1 is a block diagram showing an embodiment of a system of the invention.

FIG. 1 shows a system 100 of an embodiment of the invention. This system 100 will be described in the context of a financial institution such as brokerage company, but the basic operation could be extended to other types of organizations. The system 100 includes a number of customer representative computers 102 . . . N. As is widely known a computer as commonly implemented, and used in computer networks will generally include a number of well-known components. These components can include a communication, or system, bus or other communication mechanism for communicating information between elements of the computer, and a processor coupled with bus for processing information. Computer systems can also include a main memory, such as a random access memory (RAM) or other dynamic storage device, coupled to bus for storing information and instructions to be executed by processor. The main memory also may be used for storing temporary variables or other intermediate information during execution of instructions to be executed by processor. A computer system can further includes a read only memory (ROM) or other static storage device coupled to bus for storing static information and instructions for the computer processor. A storage device, such as a magnetic disk or optical disk, is frequently provided and coupled to bus for storing information and instructions.

A display can be coupled to the bus displaying information to a computer user. An input device, including alphanumeric and other keys, can be coupled to the bus for communicating information and command selections to the processor. Another type of user input device is cursor control, such as a mouse, a trackball, or cursor direction keys for communicating direction information and command selections to processor and for controlling cursor movement on the display. The computer can also include a communication interface coupled to bus. The communication interface provides a two-way data communication coupling to the network 111.

One or more processors in a multi-processing arrangement may also be employed to execute the sequences of instructions contained in main memory. In alternative embodiments, hard-wired circuitry may be used in place of, or in combination with, software instructions to implement the invention.

The customer representative computers 102 . . . N are connected to a communication network 111. The communication network could be a LAN, WAN, or other communication network such as the internet.

Additionally, multiple supervisor computers 112 . . . N can also be coupled with the network. Also coupled with the network is an alerts computer 114. The alerts computer could be implemented as a stand alone application server, or it could be part of a main frame computer, or other general purpose computer where one or more of the processors are programmed to implement the operations discussed herein. Indeed the operations of the alerts computer could be distributed across multiple computers. The alerts computer will be provided with access to a number of different types of data. These different types of data are shown as a customer personal data database 116, a customer account information database 118, and a market information database 120. These databases could of course be implemented as a single database, or in some instances the data could be provided as a data stream as opposed to a relatively static type of data. For example, some of the market information data could be provided as a data stream. The databases could be stored in non-volatile memory storage systems such as a disk drive, or other memory storage device.

The alert computer is programmed to provide an alerts analyzer module 122 which operates to analyze the relevant information, and to apply a series of rules to the analysis of the data, where depending on the rules and the underlying information, alerts are generated. The alert computer also includes an alert management module 124. The alert management module 124, provides for the transmission of the alerts to customer representative computers 102 . . . N, and manages and updates an alert tracking database 126. The alert tracking database could be incorporated into one of the previously discussed databases, or it could be implemented as a separate stand alone database.

Figure 2:
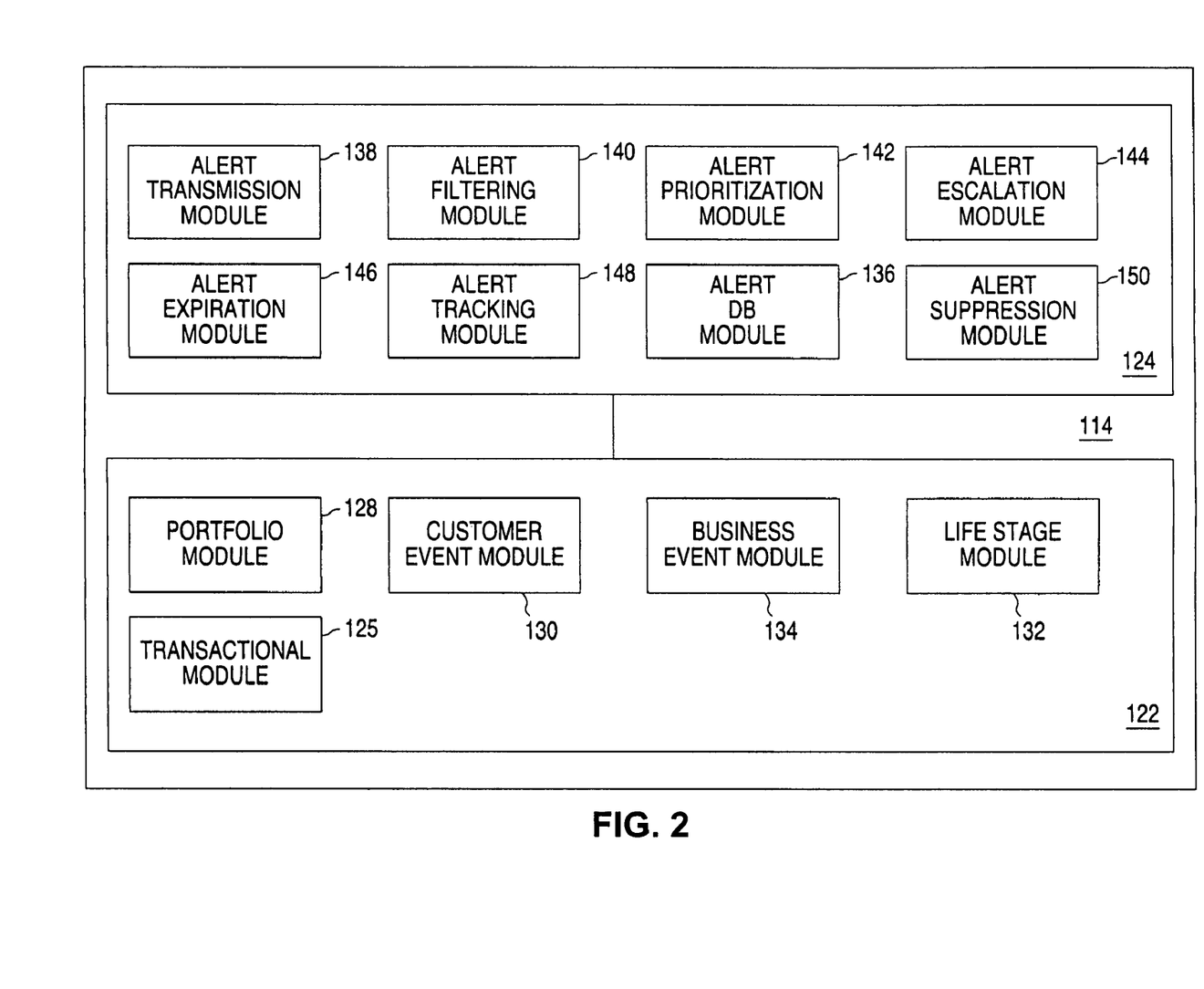
FIG. 2 is a block diagram showing an embodiment of different modules of an alert computer of the invention.

FIG. 2 shows an expanded view of aspects of an embodiment of an alerts computer 114. It should be recognized that alerts computer while potentially being a much more powerful computer than the customer representative computer described above, would in one embodiment nonetheless include the same basic elements as the customer representative computer. Further, the discussion below will refer to modules or sub-modules of the alerts computer. These modules or sub-modules can be sets of instructions which a processor, or in some cases processors, of the alerts computer are programmed to execute; specifically, different sub-modules of the Alert tracker module 124 are shown, and different sub-modules of the alerts analyzer module 122 are shown. It should be noted that the embodiment shown in FIG. 2 could be implemented in a wide range of different ways, where various other modules, or sub-modules, would be utilized, and some of the sub-modules shown in FIG. 2 could be excluded for example.

At this point the discussion of the operation of the different modules shown in FIG. 2 will be provided. The alert analyzer module 122 includes a transaction sub-module 125 which operates to generate alerts based on client initiated actions that could lead to potential business opportunities to make beneficial recommendations to the customer. For example, a customer initiated transfer of an account into a financial institution, can generate a transaction type of alert where a customer representative is provided with an alert which prompts the customer representative to contact the customer. The sale of a large stock position in an account is another transactional event that could produce an alert to contact a customer to discuss possible financial strategies and plans for the proceeds of the stock sale. Another transactional type of alert can be generated where a customer does research on a website of the financial institution. For example, many financial institutions provide extensive research tools on their websites for their customers, monitoring of the customer's research activities, can indicate that customer has a particular financial planning question or need, and in selected circumstances an alert can be generated which prompts a customer representative to contact the customer to inquire about providing possible assistance to the customer.

A portfolio module 128 can also be provided which operates analyze customer information, and specifically customer account information to determine if a portfolio based alert should be generated. Portfolio alerts generally relate to identifying investment opportunities which can be identified based on a customer account's holdings. For example, in a situation where customer brokerage account is identified as having performance below a predetermined threshold level, a portfolio based alert can be generated to prompt a customer representative to contact the customer and offer to provide financial planning assistance. In a situation where the portfolio module 128 identifies that a particular account has a large over concentration in a particular stock, an alert can be generated prompting a customer representative to contact the customer to advise the customer as to risks associated with over concentration of an investment in a single stock.

A customer event module 130 provides for analyzing customer profile information and other customer events and generates event alerts based on such analysis. For a customer service experience event, such as a customer complaint, or complex customer interaction with a service provider of the financial institution an event alert can be generated and provided to the customer representative to prompt the customer representative to contact the customer. The customer event module 130 can also generate alerts that prompt a customer representative to contact a customer when the customer is identified as having participated in particular event. For example, the customer might have attended a live training seminar, or might have attended a web based training seminar.

Additionally, a life stage module 132 can be provided, where the life stage module 132 reviews data to identify major events reflected in the customer data that may affect a customer's investment objectives or investment needs. These events could include for example, a marriage, death, birth, relocation, an anniversary etc. In response to such events the life stage module 132 can generate an event alert to prompt a customer representative to take some action to initiate communication with the customer.

The business module 134 can generate automated communications with a customer, such as sending an account statement or a trade confirmation statement.

The alert tracking module 124 includes a number of sub-modules. The alert database module 136 manages the reading from, and the writing to, the alert data database. The alert transmission module 138 manages the identification of customer representatives and supervisors, and generates the different alert pages which can be are transmitted to the customer representative computers and supervisor computers. The Alert filtering module 140 can allow for different user selected filtering to be applied to generation of the alert pages, such that selected types of alerts can be excluded from presentation to the customer representatives, and the filtering module can also be programmed to apply different system wide rules for the filtering out of certain selected types of alerts. The alert prioritization modules 142 can apply different rules in terms of different rankings for the presentation of alerts to the end users of the system. The prioritization of the alerts could be managed, or determined, by either the end user of the alerts, for example the customer representative, and/or the prioritization of the alerts could be determined by a manager who wants to control the prioritization of the alerts. Indeed, as will be discussed in more detail below, one of the benefits of an embodiment of the invention herein is that it provides for the collection of extensive data regarding the processing of alerts, and can record the results of taking action with respect to an alert. Overtime analysis of the various outcomes related to the processing of alert can provide valuable information identifying those alerts, and follow up responses to alerts which are most effective in terms of improving the service to the customer.

The Alert escalation module 144 applies different rules to the different alerts, such that certain alerts can be escalated or presented to different supervisory levels of the organization. The alert expiration module 146 is programmed to manage the expiration of the different alerts. The alert tracking module 148 manages the presentation of alert tracking templates to the customer representatives, and receives the customer representatives input to through the tracking template. The suppression module 150 operates to provide for the suppression of a particular alert, or a certain type of alert, for a period of time. For example, in a situation where a customer representative has taken action with respect to a particular alert, and the customer has indicated that they do not want to take action with respect to a particular recommendation, then similar alerts pertaining to the same issue can be suppressed for a given period of time. The suppression type of operation is discussed in more detail below.

Table 1 is provided below to illustrate a number of different specific alerts which could be provided for using an alert analyzer module as described above. The "Category" column identifies the specific category type of the alert.

TABLE 1

| No. | Category | Alert Name | Description |
| --- | --- | --- | --- |
| 1 | Event | Sudden Liquidation | Liquidation of >=50% of portfolio value to cash within 2 weeks |
| 2 | Portfolio | Under-Performing Portfolio | Under-performing portfolio for 3 months straight against benchmark (S & P, Index, etc.) |
| 3 | Portfolio | MF (mutual fund) Suggestion | Under-performing clients with all equity holding |
| 4 | Portfolio | SER (security equity rating) Downgrade | 10% of portfolio downgraded 2 levels or to very low level ratings (D/F) |

TABLE 1-continued

| No. | Category | Alert Name | Description |
| --- | --- | --- | --- |
| 5 | Life Stage | Birthday | Birthday of the primary contact within a household (expire after 2 weeks) |
| 6 | Transactional | Large TOA (transfer order authorization) Out | TOA out of >=20% of portfolio value |
| 7 | Portfolio | Concentrated Position | Holding one equity position >=20% of portfolio value |
| 8 | Event | Product/Offer Interest | Clients who requested product/offer packages |
| 9 | Event | Trading Threshold | Clients who experienced a surge in trading activities |
| 10 | Portfolio | Low Grade Mutual Funds | HHs (households) that have at least 20% of portfolio value invested in 1 or 2 Morningstar rated mutual funds |
| 11 | Transactional | Verification of Deposits | HHs that have had a "Verification of Deposits" requested recently. This is a good indicator that your client might be applying for a mortgage/HELOC (home equity line of credit). |
| 12 | Transactional | Large Deposit | Cash, Stock, or TOA deposits of >=20% of portfolio value |

The above table provides examples of different alerts, and is meant to be illustrative, but of course a wide range of different alerts could be utilized. For example, some financial intuitions can provide for account management services. In some situations, for example in accounts where there have been high capital gains distributions, the customer may want to consider account management services to help reduce future tax liabilities due to capital gains. Thus, an alert can be generated where an account has a relatively high capital gains distribution. Additional alerts can be provided for where it appears that a customer might have an interest in securities lending services, corporate services, or general service alerts, for example, where a negotiated margin discount is about expire.

The analysis of customer data and the generation of alerts can be a computationally demanding process. Additionally, as will be discussed in more detail below the providing of alerts to customer representatives should be done in a selective manner so as to reduce the likelihood of a customer representative becoming inundated with so many alerts that the value of the alerts becomes diminished. Thus, it is advantageous to develop a set of rules which provide for frequency intervals of analyzing data to make determinations as to when to provide for the generation of alerts, and further it is also advantageous to provide rules for expiring alerts and in some cases suppressing alerts. Table 2 shows an example of an embodiment of a table of rules to which can be used in connection with the generation, and tracking of some exemplary alerts.

TABLE 2

| Alert name | Run cycle | Expiration | Suppression |
| --- | --- | --- | --- |
| Birthday | Weekly | 30 Days | None |
| Cash Concentration | Weekly | 30 Days | 90 Days |
| Concentrated Position | Weekly | 30 Days | 90 Days |
| Large Deposit | Daily | 30 Days | None |
| Large Withdrawal | Daily | 30 Days | None |
| Large TOA In | Daily | 30 Days | None |
| Large TOA Out | Daily | 30 Days | None |
| Low Grade Mutual Funds | Weekly | 30 Days | 180 Days |
| MF Suggestion | Weekly | 30 Days | 180 Days |
| SER Downgrade | Weekly | 30 Days | None |
| Sudden Liquidation | Weekly | 30 Days | None |
| Trading Threshold | Weekly | 30 Days | 90 Days |
| Under-Performing Portfolio | Weekly | 30 Days | 180 Days |
| Verification of Deposits | Daily | 30 Days | None |

The first column in Table 2 shows the name of a particular alert. The second column of the Table 2 shows the frequency with which a review of customer information is run to identify whether the corresponding alert should be generated. For example, customer data will be reviewed weekly to identify situations where it is appropriate to send the customer representative an alert regarding the fact that the customer has an upcoming birthday. For a large deposit alert, however, the customer data will be reviewed daily to identify situations where a large deposit has been made. The expiration column identifies the amount of time that an alert will remain active. An active alert can be closed where a customer representative indicates that some action has been taken in connection with the alert. In one embodiment of the invention when a specific alert expires then the specific alert will no longer be presented to a customer representative. The suppression column of Table 2 refers to an operation which is different than alert expiration. Suppression prevents alerts that have been closed from being represented to a customer representative for a given period of time. For example, if a customer representative receives an underperforming portfolio alert for a customer, and the customer representative contacts the customer and determines that the client does not want to make changes in the portfolio allocation, then the next time the Underperforming portfolio analysis is done, the corresponding alerts are generated, the customer representative would likely receive another underperforming portfolio alert. In order to avoid repeatedly generating alerts on the same issue, the suppression module can operate to suppress the generation of an alert for a given period of time where the customer does not want to take a recommended action.

Figure 3:
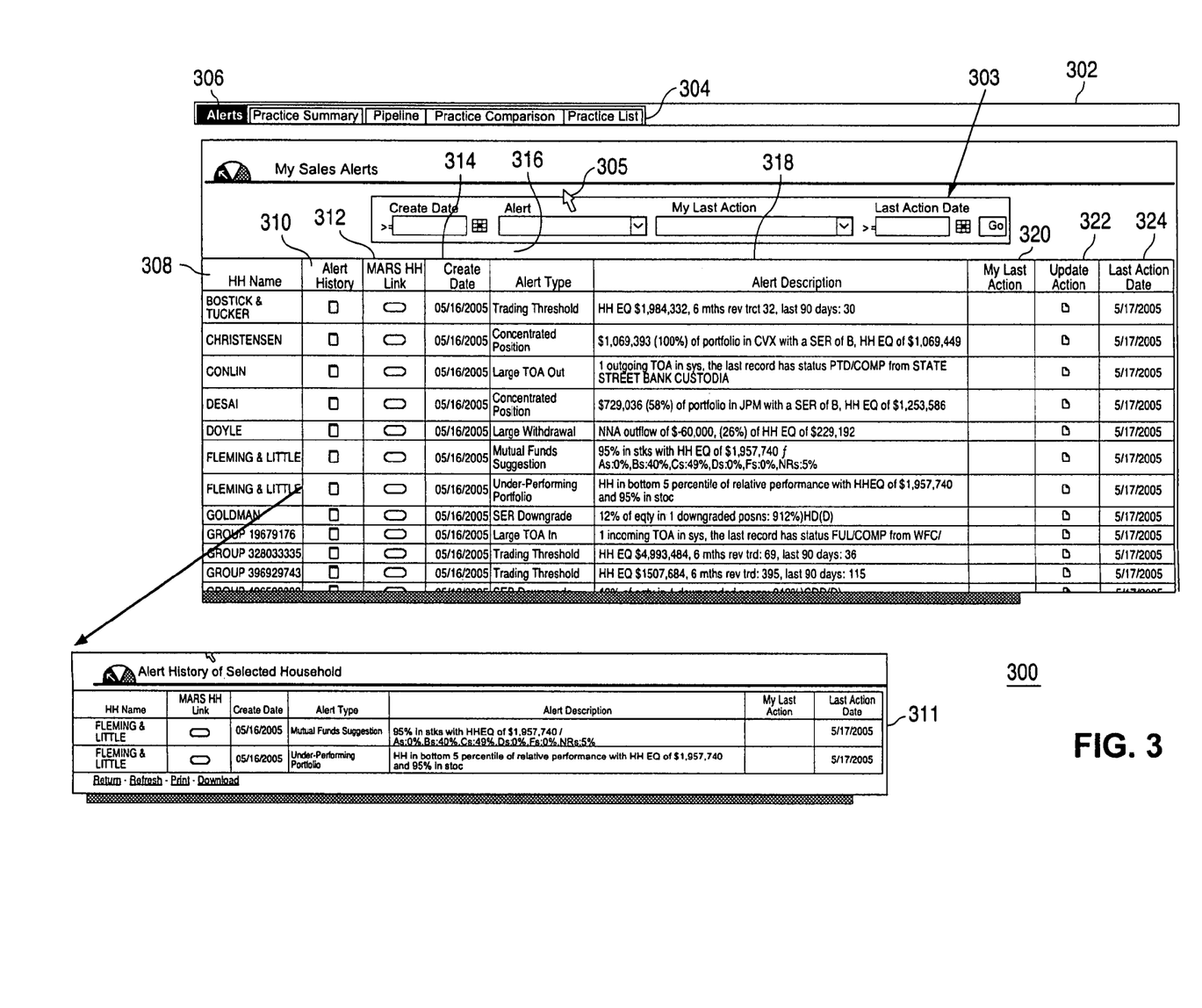
FIG. 3 illustrates portions of different customer representative alert pages according to an embodiment of the invention herein.

FIG. 3 shows portions of images which could be displayed on a customer representative's computer monitor. More specifically, for one embodiment herein, the images represent portions of pages which are displayed by a browser running on the customer representative's computer. Thus, for example the page 302 could be an HTML type of browser page, where links and commands can be included in the page. The user of the computer can then activate the links or commands by virtue of clicking a mouse or similar input device over different areas of the page 302. Additionally, the user can input different selection criteria or other data into different fields provided in the page 302. The page 302, contains a top level selection row 304, where a customer representative can select a different customer representative application. In one embodiment this selection will be done by the customer representative using a mouse to move a cursor icon 305 over the desired tab and then selecting the desired tab using the mouse. As shown in page 302 the customer representative has selected the highlighted tab 306 corresponding to alerts. The selection of the alerts tab 306, then results in the page 302 being a customer representative alerts page. The tabs adjacent to the alerts tab 306, correspond to other customer representative applications. The customer representative applications could be programs which are loaded on the customer representative's computer, or applications which reside on a central server which the customer representative computer accesses through the network 111.

In response to the customer representative selecting the alerts tab 306, the alerts applications (running in a processor on the alerts computer) operates to provide the alerts information which is provided to customer representative's computer, and the customer representative is provided with access to the operational features of the alerts application. In one embodiment the alerts applications will include an alerts manager module 124 and alerts analyzer module 122 as described above. In such an embodiment the alert computer generates pages and/or data which are provided to a browser running the customer representative computer, and the browser then displays customer representative alert pages which are shown on the computer monitor of the customer representative computer.

When a customer representative has logged on to a computer, and selected the alerts tab, the alerts computer will then access the alerts database 126 and generate the customer representatives alerts page 302. In some embodiments each customer representative will have specific customers that they are responsible for, thus the alerts provided for each customer representative will be correspond to the specific customers, which the particular customer representative is responsible for. The alerts page 302 includes a contact column 308. The contact column is shown with the title of HH Name. The HH name is a reference to household, and the column provides a name or other identifying information for a contact person associated the identified alert. In one embodiment a customer representative could use a mouse, or other user input device, of the customer representative computer to select on a name shown in contact column additional information could be provided regarding the contact person for the corresponding alert. The alert history column 310 provides an icon where the customer representative can select the icon to receive a history from the alert database 126 for all alerts created for the corresponding household. It should be noted that the system and method could provide for generating and grouping alerts at an individual account level, or accounts could be grouped at a household level and then a user could drill down by clinking on links associated with a given alert to determine which specific account associated with a given household was the basis for the alert. In one embodiment the alert tracking database 126 stores information for a plurality of alerts generated by the alerts analyzer module 122. The alerts tracking database 126 can provide a status action field for each of the alerts, and the status action field can provide for one a plurality of different status conditions for the corresponding alert. These different status conditions can correspond to the different alert status conditions which the customer can select from in the tracking template 406 as shown in FIG. 4, which is discussed in more detail below.

The image 311 shows a portion of an alert history page which would be displayed on customer representative computer display in response to a customer representative selecting a history icon corresponding to the Fleming & Little household which is shown in column 310 of page 302. This alert history page can then display alert history information for the corresponding household. Page 302 also includes a customer relationship application (CRM application) access column 312, which has a header MARS HH link. The customer representative can select the icon in the CRM column 312, and they will be provided with access to a CRM application which provides access to extensive customer relationship data information, and the customer representative can enter new relevant information, and review previously entered information. The create date column 314 identifies the date on which the corresponding alert was created. The alert type column 316 identifies the type of alert which is shown in the corresponding row. The customer representative can select on a given alert type shown in column 316 and will be provided with a definition of the given alert. The alert description column 318 provides a detailed description of the underlying data and analysis which was the basis for the corresponding alert.

The My Last Action column 320 provides information as to the most recent action taken by the customer representative in connection with the corresponding alert. In the case of the page 302 all of the entries in column 320 are blank which would indicate that no action has been taken in connection with any of the displayed alerts. If an action had been taken with respect to an alert, then the action taken would be identified in the My Last Action column 320. The Update Action column 322 provides icons where a customer representative can select on an icon and an action for the corresponding alert can be updated, as will be discussed in more detail below. The page 302 also includes a Last Action Date column 324 which displays the last date of an action taken in connection with a corresponding alert. In one embodiment the Last Action Date column will default to the date when the corresponding alert was first made available to the customer representative, until such time as the customer representative indicates that some action has been taken with respect to the corresponding alert. In some embodiments the time at which a customer representative provides an indication that some action has been taken will be recorded in terms of the date, and the exact time at which the entry was provided indicating that some action was taking. In this way realtime data can be provided to a supervisor, so that the actual time of data entry is recorded.

The page 302 also includes a customize date box 303 which allows a user to input date criteria which acts to filter the alert information shown in the customer representative alert page 302.

FIG. 4 shows a series images 400 which illustrate a method of an embodiment of the invention. The images show portions of different pages which would be displayed on a customer representative's computer monitor. Image 402 shows a portion of a customer representative alerts page, which could be shown on a display of a customer representative computer. The page of image 402 would include links as described above and generally corresponds to the type of alert page 302 described above. However, for purposes of illustration only a portion of the page which would actually be shown on the display is shown in image panel 402. In response to the display of the page the customer representative can review the displayed alerts, and make a determination as to which alerts he or she will take an action in response to. In the operation shown in FIG. 4, the customer representative has selected the update action icon 404, to indicate that the customer representative has taken some action in response to the corresponding alert, which in this case would a trading thresholds alerts for the household identified as Bostick & Tucker. In response to the customer representative selecting the icon 404 an alert tracking template 406 is generated and displayed on the customer representative computer monitor. The alert tracking template 406 then provides a number of predefined categories where a user can select from the predefined categories to characterize the status of actions taken in response to the corresponding alert. The users input, typically provided by clicking a mouse on the predefined category that corresponds to the change in the action status is received by the alerts computer, and the alert tracking database is updated to reflect the change in the action status for the corresponding alert.

The alert tracking template 406 shown in FIG. 4 provides six different categories which a customer representative can select from to characterize the status of action relative the corresponding alert. A first field of the alert tracking template 406 is an "Attempting" field, which a customer representative can select when the customer representative is in the process of attempting to reach the client, but has not yet made actual contact with the customer. A second category of the alert tracking template is an "In Progress" category which customer representative can select to indicate that communications with the customer are on-going in connection with the corresponding alert. For example, in the case of the Trading Threshold alert, the customer might be considering opening a different type of account which provides for different pricing options for accounts with high trading volumes, or the customer might be considering whether they would like to opt for a managed account, which would provide for some assistance in the managing of the account etc.

The tracking template 406 also includes a "Closed-Canceled" category where the customer representative can select this category to indicate that alert has been cancelled because no action was warranted for the corresponding alert. The template 406 can also include a "Closed-Unsuccessful" attempts category where a customer representative can select this category to indicate that alert has been cancelled due to an inability to reach the customer. The template 406 can also include a "Closed-No Further Action Required" category where a customer representative can select this category to indicate that the alert has been cancelled after a successful discussion with the client. For example, in response to a prolonged period of poor performance in an account, an alert could be generated, and the customer representative would receive the alert and in response contact the customer with financial advice that could provide the customer with better performance in the account. In successful cases, the customer would take action consistent with the financial advice.

The template 406 can also provide a "Closed-Opportunity Created" category. This category could be selected where a customer representative in response to an alert contacted a customer, and as a result of this contact additional opportunities to generate further business was identified.

After the customer representative has selected the field which corresponds to the appropriate category, the customer representative can select a refresh icon 408, which will result in the page 402 being regenerated to reflect an update in the My last action column, which can be described more generally as a status column, would show the updated information corresponding the customer representative's selection in the template 406. For example, the updated page 410 shows that "In progress" status 412 in the status column 416 corresponding to the selection 414 in the template 406.

The operation of the system 100 in connection with the method illustrated by FIG. 4 would include a customer representative initially logging on to a customer representative computer. The Alert analyzer would operate to generate alerts based on an analysis of customer data; this customer data could include for example specific personal information for a customer, or customer account information, such as the underlying investments held in a customer account. The Alert manager module would maintain the records of the alerts in the alert tracking database. In response to the customer representative selecting the alerts application tab, the alerts computer would generate a customer alerts page and transmit it, or the underlying alert information, to the customer representative's computer, where the alerts page would be displayed. In response to the customer representative interacting with the alerts page to select the update action icon, the tracking template would be displayed on the customer representative's computer. The customer representatives input to the tracking template would then be transmitted to the alerts computer, and the input information would be used to update the alert tracking database. The updated information in the alert tracking database can then be used to provide updated alert information to the customer representative, or to the customer representative's supervisor.

In the page 410 many of the entries in the status column are blank which would generally indicate that customer representative has not taken any action with respect to the corresponding alert.

Figure 5:
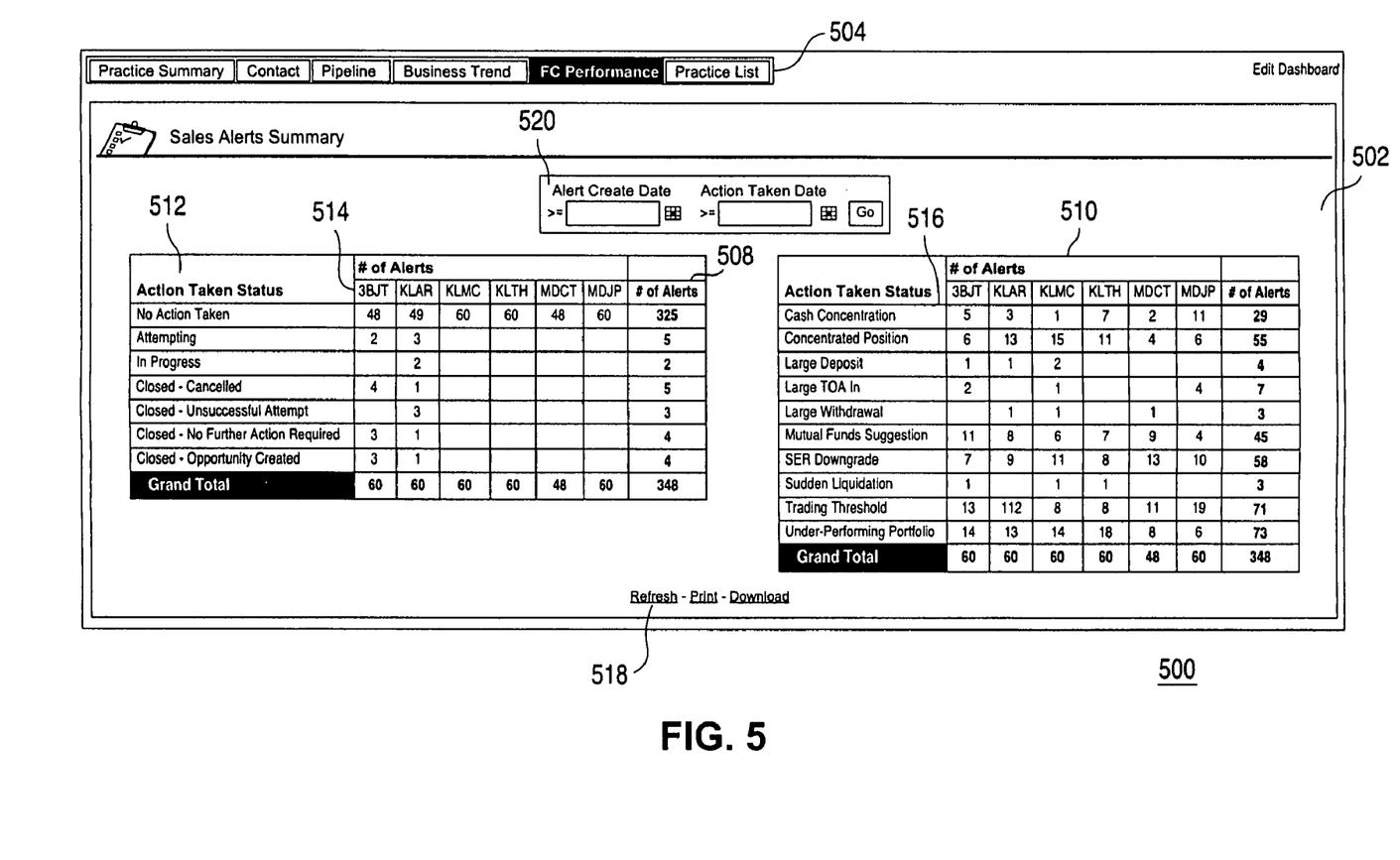
FIG. 5 illustrates an embodiment of a supervisory alert summary page.

FIG. 5 shows a supervisor alert summary page 502 which could be shown on a display of a supervisor computer 112. Fundamentally, the supervisor computer can be the same type of computer as the customer representative computer, however, when a supervisor logs onto the computer, the computer network will provide different applications, and access, to a supervisor than to a customer representative. The supervisor alert summary page could be for example an HTML page which is displayed by a browser running on the supervisor computer. The Alert computer 114 can generate the alert summary page and provide this page to a supervisor computer 112 of the system 100. The alert summary page 502 includes a top level selection row 504, where a supervisor can select between different supervisor applications. In an embodiment of the system and method herein a supervisor would typically supervise a number of different customer representatives. In the alert summary page 502 the tab FC performance 506 has been selected. The term FC is an acronym corresponding to financial consultant, which could be one type of customer representative. In connection with the selection of FC Performance tab 506, the alert summary page 502 is generated by the alert computer and transmitted to the supervisor computer 112. In one embodiment the alert summary page 502 will show information relating to the activity, or performance, of one or more of the customer representatives who are supervised by the supervisor, and show a summary of alert information for each of these customer representatives.

For example, the alert summary page 502 includes an action taken status table 508, and an Alert type status table 510. The action status table 508, includes a column 512 identifying action taken categories. Specifically, the action taken status column contains rows which correspond to the different action categories which are provided for in the alert tracking template 406. The action status table 508 also contains a customer representative row 514 with column entries which identify the customer representatives which are supervised by the supervisor who is logged onto the supervisor computer 112. The Action status table 508 then provides a matrix grid where a supervisor can quickly identify the status of activity for a given customer representative relative to alerts which have been provided to the customer representative. For example, the customer representative identified as KLAR in the customer representative row 514 is shown as having received a total of 60 Alerts, and KLAR has not take action with respect to 49 of the alerts, has made 3 entries in an alert tracking template showing an attempt to make contact with a customer in response to an alert, and the various state of activity regarding the other alerts can be seen in the column corresponding the KLAR customer representative. Similarly the state of various actions take by the other customer representatives identified in row 514 are readily observable. By reviewing the Action taken status table 508 a supervisor can quickly and easily view the status of action taken by the customer representatives relative to the alerts. Periodic review of such a table can improve the supervision of customer representatives, and spot situations where a customer representative is not taking adequate action relative to alerts.

In one embodiment the information shown in the alert summary page 502 can provide HTML type links which a user can click on to obtain more information. For example, a supervisor could click on the identifier of a customer representative such as KLAR, and the supervisor's computer would then be provided with a page showing alert details for the customer representative corresponding to the identifier KLAR. In addition a supervisor could click on an entry in the Action taken status column 512 to see a list of all the alerts which have a most recent action status corresponding to the selected action status. For example, if a supervisor were to select the "Closed-Canceled" entry in the Action Taken Status column 512, then the alert computer 114 could generate a page showing all the alerts which have a most recent action of "Closed-Canceled".

The Alert types status table 510 operates in manner analogous to the action taken status table 508, except that the Action Taken Status column 512 is replaced with an Alert Type column 516. The Alert type column 516 contains rows for the different possible types of alerts, and a customer representative row 518 is provided which identifies the different customer representatives which are under supervision. The table then provides a grid which identifies the different types of alerts which have been provided to the different customer representatives. The supervisor can then select from the different entries of the Alert type column 516 to see a detailed list of all the alerts of the corresponding type. The page 502 also includes a refresh icon 518, where a user can select on the refresh icon. In response to a selection on the refresh icon the alert computer 114, refers to the alert tracking database 126 to obtain the most up to date information for the alerts, and provide the user with a refreshed alert summary page 502. Thus, providing a supervisor with a tool to view actual real-time reports showing the customer representatives progress in responding to an alert.

The page 502 also includes a customize date box 520 which allows a user to input date criteria which acts to filter the alert information shown to the supervisor in the alert summary page 502.

FIG. 6 shows a supervisor selected customer representative summary page 600. The summary page 600 is provided in response to a supervisor selecting a specific one of the customer representatives shown in the tables 508 or 510 in page 502. The summary page provides a supervisor with specific information for the selected customer representative so that the supervisor can view the selected customer representative's progress against available alerts and actual alerts to provide potential coaching opportunities. Specifically, column 602 shows the action taken status for the available alerts which have been provided to the customer representative identified as 3BJT. The page 600 corresponds to the page which would be displayed where a supervisor selected the customer representative identified as 3BJT in the page 502.

The row 604 of page 600 identifies the various different types of alerts which have been provided to the customer representative 3BJT. The numerical entries in the table 606 provided by the column 602, and the row 604 then provide entries which identify the action status for each of the different types of alerts that have been provided to the customer representative. The page 600 operates such that a user can select on one of the numerical entries in the table 606, and lower portion of the page 602 can show more information corresponding the selected alert and action status entry. For example, page 600 illustrates a situation where a user has selected on the numeral 3 identified with callout number 608. In response to the selection on the number 3 (corresponding to "No Action Taken" and the alert type "Cash Concentration") information corresponding to the selected action status and corresponding alert is obtained, and the page 600 can be updated to include the requested information alert specific information, as is shown in the lower portion 610 of the page 600. The supervisor can then review specific details of the corresponding alerts.

Figure 7:
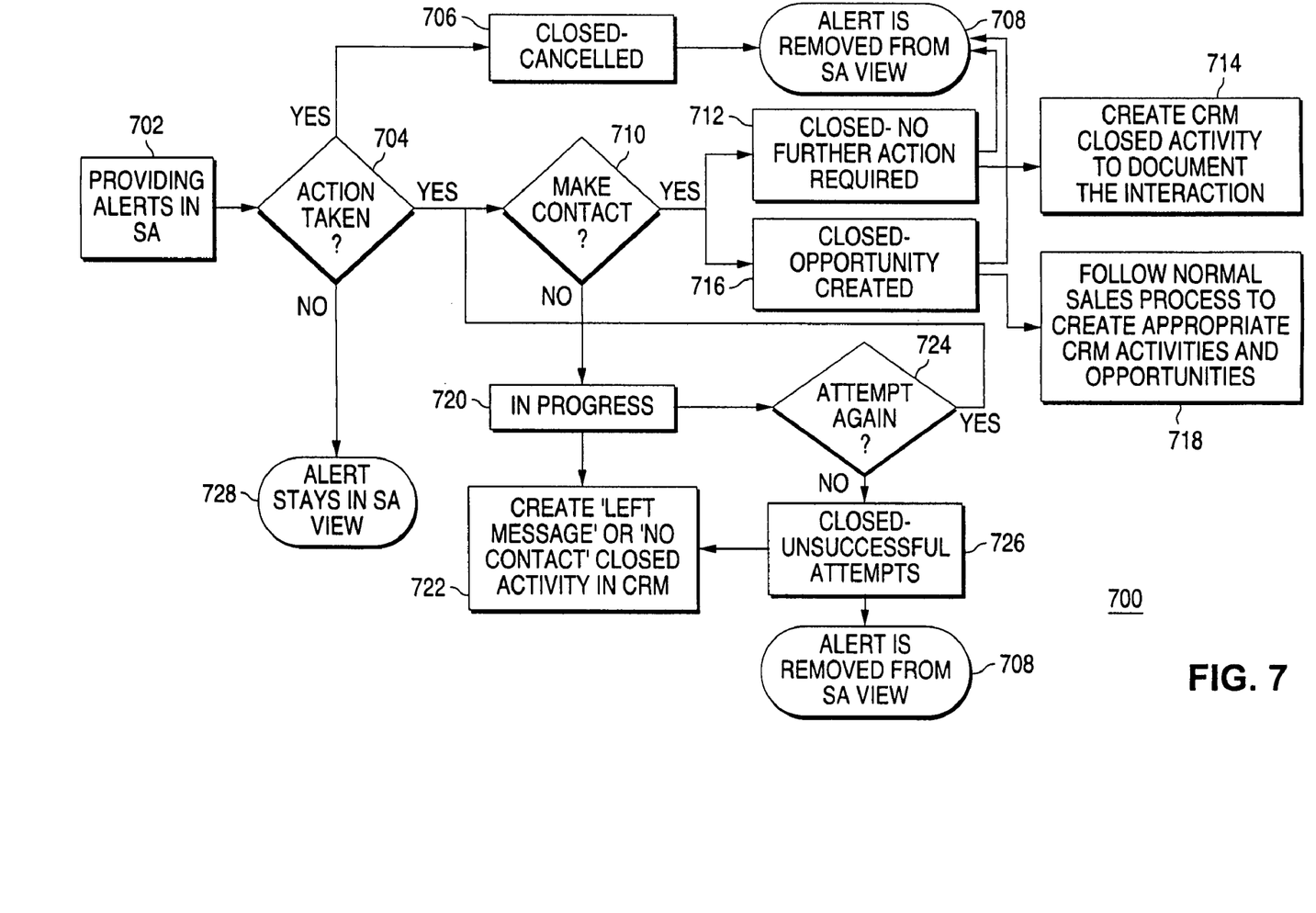
FIG. 7 is a flow chart illustrating an embodiment of a method of the present invention.

FIG. 7 illustrates a method 700 of an embodiment of the invention. The method includes a providing 702 an alert in a page of alerts which can be viewed on a customer representative's computer. It should be noted that the flow chart illustrated in FIG. 7 includes numerous blocks which refer to SA. In the context of FIG. 7, "SA" is a reference to the display of sales alerts, such as an alert shown on the customer representative alerts page described above in connection with FIG. 3 for example. The customer representatives input through the customer representative's computer is then monitored, to determine 704 an action status for the alert. This monitoring could for example include monitoring a customer representative's input through an alert tracking template as described above. If an input from the customer representative indicates that the action status for the alert is closed-canceled 706, then the alert is removed 708 from display in the page of alerts. If the input from the customer representative indicates that action was taken, then a determination is made as to whether contact was made with the customer 710. If contact was made, then a determination is made as to whether the communication with the customer representative resulted a closing of the alert, such that no further action is required 712. In this situation the customer representative could also be prompted to create 714 an entry in a customer relationship database (CRM) to document the substance of the communication with the customer that resulted in closing the alert.

If the communication with the customer resulted in the creation 716 of an opportunity for further action in connection with the alert, then the alert can be removed 708 from view in the page, and the customer representative can be prompted to follow a sales process in connection with the created opportunity, and to document the substance of the communications in a customer relationship database 718.

If the determination 710 that action was taken in connection with the alert, but that no contact was made with the customer, then the page can be updated to show that the action status for the alert is in progress 720. The customer representative can then be prompted to document 722 the contact attempt in the customer relationship database. When an attempt has been made to contact the customer, the alert can still be displayed on the alert page with an indication that the action in connection with the alert is in progress. The customer representative can make a determination 724 as to whether a subsequent attempt should be made. If the customer representative decides that no more attempts will be made in connection with the alert 726, then the alert can be removed 726 from the page of alerts, and the customer representative can then document 722 the reason for closing the alert.

If it is determined 704 that no action has been taken in connection with an alert, then the alert can be maintained 728 on the alert page.

Figure 8:
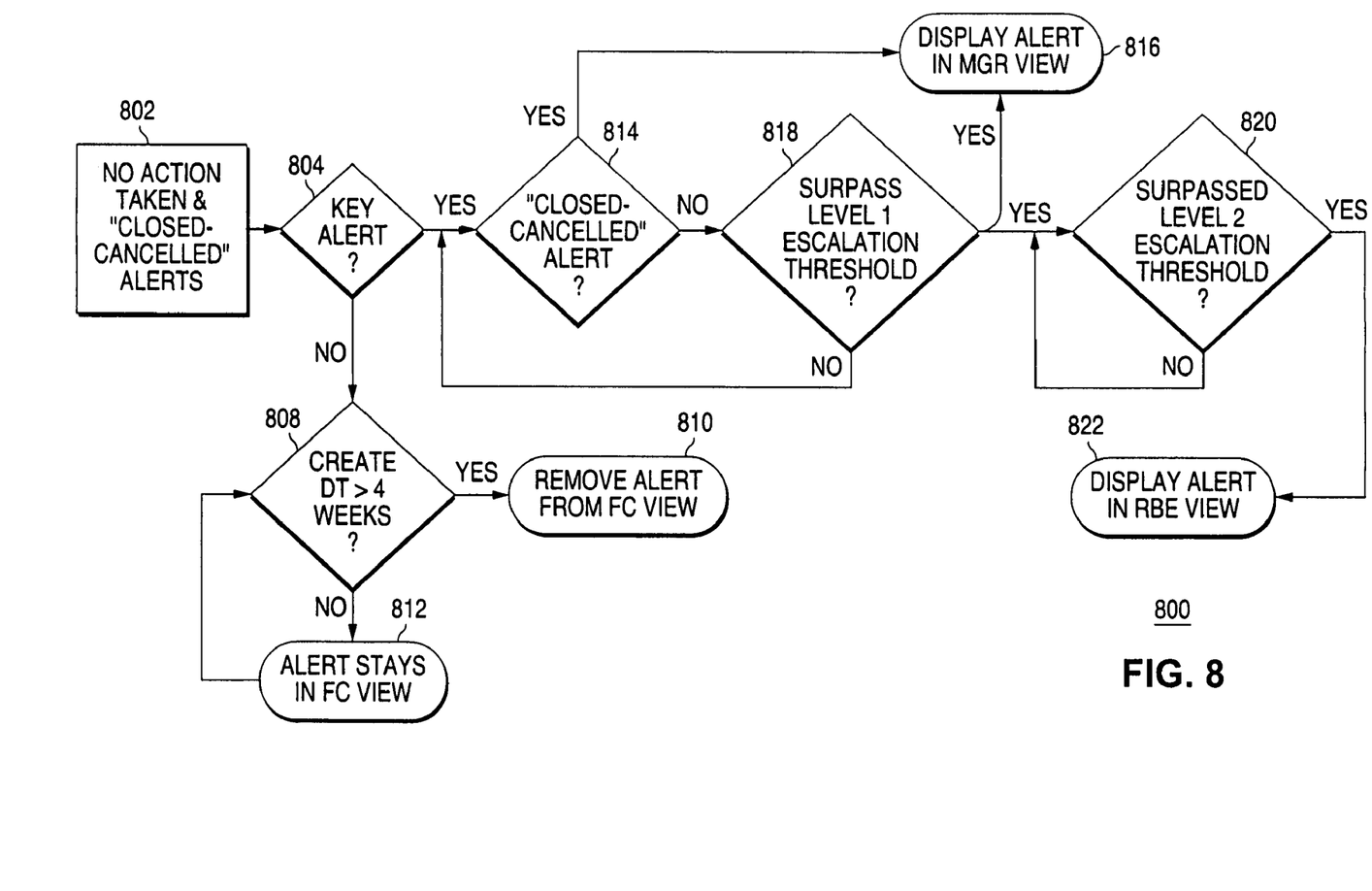
FIG. 8 is a flow chart illustrating an embodiment of a method of the present invention.

FIG. 8 shows another method 800 of an embodiment of the invention. The method 800 illustrates a prioritization of alerts, which facilitates a supervisor efficiently reviewing and managing the performance of multiple customer representatives using an alert escalation process. Initially a customer representative input is received 802 through an alert tracking template which indicates that an alert has been closed-cancelled, or an alert might have a corresponding status which indicates that no action has been taken for a predetermined amount of time. For example, one type of alert might allow a customer representative three working days to take action, prior to considering the alert for escalation to a supervisor. Based on either the fact that no action has been taken, or based on the status input by the customer representative, a determination is made as to whether the alert should be escalated, for example by presenting an alert in a supervisor's summary page of alerts. In one embodiment the different alerts can be broadly categorized as either a high priority alert (key alert), or a lower priority alert. The process of 800 provides for making a determination 804 as to whether an alert is a key alert, if it is determined that a particular alert is not a key alert, then a determination 808 is made as to how long ago the alert was generated. If the alert is more than a predetermined amount of time old (e.g. is the alert more than 4 weeks old) then the alert will be will be removed 810 from the page of alerts provided to the customer representative. If the alert is relatively new then the alert will be maintained 812.

If the alert is determined to be a key type of alert then if the alert has a status of closed-canceled 814 according to a customer representative input, then the alert will be displayed 816 in summary alert page to a supervisor. If the status of the alert is that no action has been taken, then a determination 818 is made as to whether the alert has characteristics which causes it to surpass a first escalation threshold. For example, for a first type of key alert if no action has been taken for period of time exceeding one week, then the alert can be escalated such that it is displayed 816 on a supervisor's summary page of alerts. Where a determination is made that an alert should be escalated to a supervisor's alert summary page, a second level of analysis can be applied. This second level can provide for determining if the alert particular alert is sufficiently old, or if it is of sufficient importance that it should be escalated such that it is displayed in a summary page for of a higher level supervisor's computer. If a determination is made that the alert is relatively new then the alert will not be escalated.

Figure 9:
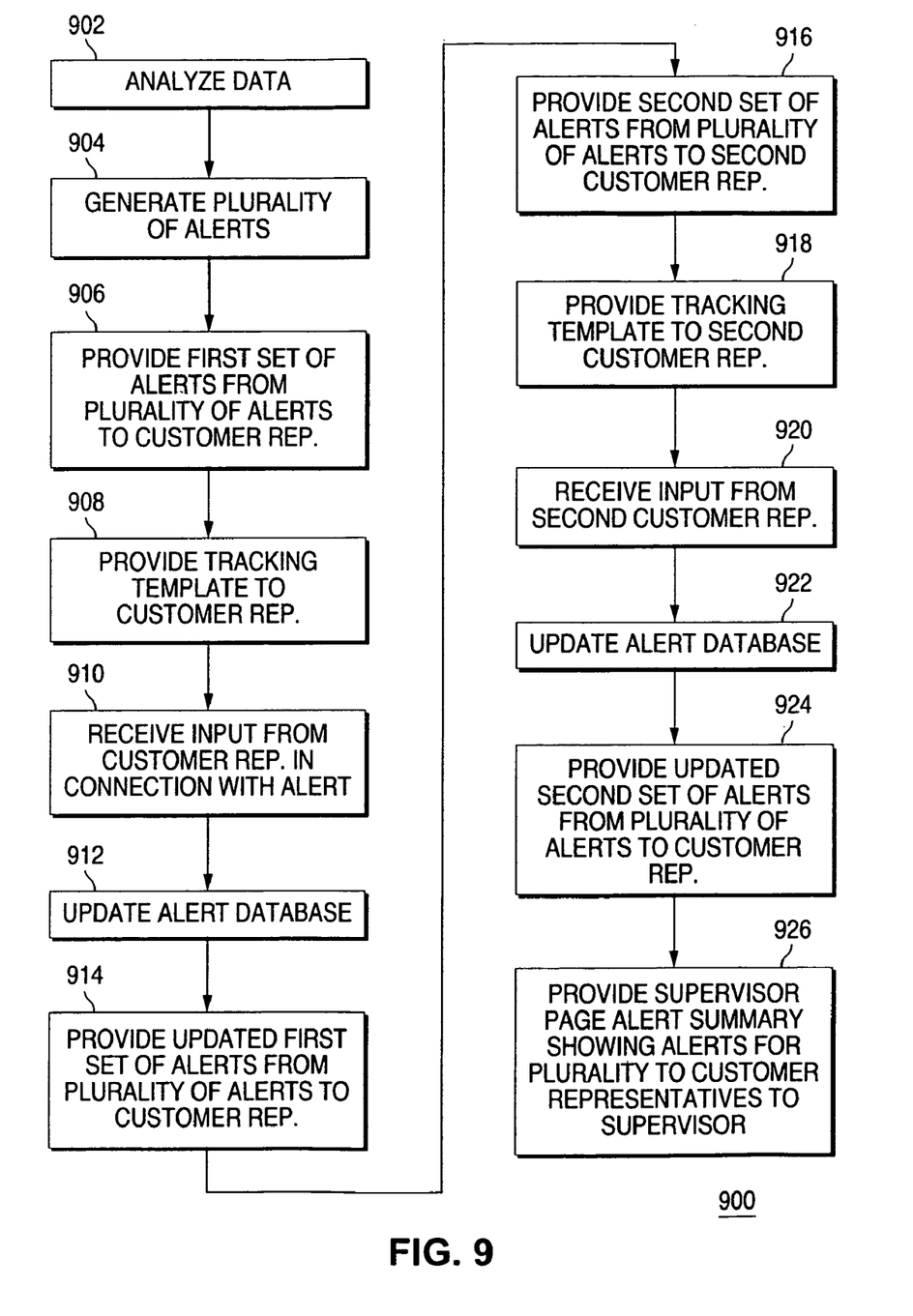
FIG. 9 is a flow chart illustrating an embodiment of a method of the present invention.

FIG. 9 illustrates an embodiment of method 900 herein. The method 900 provides for the alert analyzer module analyzing 902 data. Based on the analysis of the data, a plurality of different alerts are generated 904. A first set of alerts from the plurality of alerts are provided 906 to a first customer representative. This providing of the first set of alerts to the first customer representative could be done through a customer representative alert page as described above. A tracking template can be provided 908 to the customer representative. In one embodiment this tracking template will be provided to the customer representative in response to the customer representative selecting on an icon in a customer representative alert page.

The tracking template can provide a number of different categories where a user can provide an input corresponding to an action status for an alert. The user input is received 910, and the alert manager module can then process the input. In response to the input the alert database can be updated 912 to reflect the change in the status action for a given alert. The first customer representative can then be provided 914 with an updated page with the first set of alerts, where the updated page will reflect the customer representatives input through the alert tracking template.

The method can further include providing 916 a second set of alerts form the plurality of alerts to a second customer representative. For example the second customer representative can be provided with a customer representative alert page which shows the customers, or customer account groups, which the second customer representative is responsible for. In response to the second customer representative interacting with the alert page the second customer representative could be provided with a tracking template. The second customer representative could then input information through the tracking template. The second customer representative input is received 920, and the alert manager module can then process the input. In response to the input the alert database can be updated 922 to reflect the change in the status action for a given alert. The second customer representative can then be provided 924 with an updated page with the second set of alerts, where the updated page will reflect the second customer representative's input through the alert tracking template.

Typically at any of many different points in the process, a supervisor could log onto a supervisor computer and be provided 926 with a supervisor page alert summary showing alerts for a plurality of customer representatives which are managed by the supervisor.

As detailed above various embodiments of the inventions herein provide for generating a range of different alerts, and for then presenting these alerts to a customer representative. The customer representative can then be presented with a tracking template which allows a customer representative to input information regarding action taken in connection with a particular alert. The time at which the action was taken in connection with a particular alert can be recorded, and the outcome of the action taken can also be recorded. The advantage of using a tracking template to input information regarding the actions taken is that the collection of data can be generated which tracks the different outcomes of various actions taken in response to various alerts. Overtime the tracking of alerts, and the actions and results of such actions taken in response to various alerts could provide insight into how to prioritize various alerts. For example, overtime it may become clear that in situations where a customer has transferred a large amount of funds into an account, then the customer is most likely to positively respond to investment recommendations if they are contacted within 1 week of the transfer of funds into the account. Whereas is the customer representative does not follow up with the customer representative within the first week of the funds being transferred into the account, then the customer is less likely to be open to investment recommendations. This is but one example, and of course there are numerous other patterns that could become apparent through analysis of the various alerts and the customer representative input through the tracking template.

Although only specific embodiments of the present invention are shown and described herein, the invention is not to be limited by these embodiments. Rather, the scope of the invention is to be defined by these descriptions taken together with the attached claims and their equivalents.

What is claimed is:

1. In a computer network a method for utilization and tracking of alerts, the method comprising:

analyzing, using one or more processors, customer data comprising customer account data, customer profile information, and market data;

and automatically generating a plurality of alerts in response to the analyzing customer data;

providing a first set of alerts from the plurality of alerts to a first customer representative;

providing the first customer representative with a tracking template;

receiving a first tracking template input from the first customer representative, wherein the first tracking template input corresponds to an action status for a first alert of the first set of alerts; and based on the first tracking template input, updating an alert tracking database to indicate the action status of the first alert.

2. The method of claim 1 further including:

wherein the first set of alerts includes at least one high priority type of alert;

determining if no action has been taken by the customer representative for the high priority type of alert within a first time period; and escalating the alert to a supervisor of the customer representative if it is determined that no action has been taken within the first time period.

3. The method of claim 1 further including:

providing a second set of alerts from the plurality of alerts to a second customer representative;

providing the second customer representative with the tracking template;

receiving a second tracking template input from the second customer representative, which corresponds to an action status for a second alert of the second set of alerts;

and based on the second tracking template input from the second customer representative, updating the alert database to indicate the status of the second alert.

4. The method of claim 1 further including:

wherein the plurality of alerts includes a plurality of different sets of alerts, wherein each of the different sets of alerts corresponds to different sets of client account groups which are assigned to different customer representatives; and generating a supervisor review page which shows an action status for each alert of the different sets of client account groups.

5. The method of claim 4, further including:

for each of a plurality alerts stored in the alert tracking database providing a status action field, with the status action field having one of a plurality of predetermined possible status conditions;

wherein the tracking template provides for a plurality of possible status conditions and these possible status conditions correspond to the plurality of predetermined possible status conditions provided for in the alert tracking database.

6. The method of claim 1 wherein the tracking template provides a plurality of predetermined status conditions which a customer representative can select from to indicate an action status for a corresponding alert.

7. In a computer network a method of managing alerts, the method comprising:

providing an alerts database which stores alerts information, wherein the alerts information includes a plurality of different alerts, and an action status for each of the plurality of different alerts, the plurality of different alerts being automatically generated in response to analysis of customer data comprising account data, customer profile information, and market data;

generating a customer representative alerts page for a customer representative, wherein the customer representative alert page shows alerts for customer accounts which the customer representative is responsible for;

in response to a customer representatives selection on the customer representative alerts page, providing the customer representative with a tracking template which allows the customer representative to input information to the alerts database to update an action status for an alert shown on the customer representatives alerts page; and providing an alerts summary page to a supervisor who supervises multiple customer representatives, wherein the alerts summary page identifies a plurality of customer representatives supervised by the supervisor, and shows alerts which have been provided to each of the plurality of customer representatives, and shows a corresponding action status for each of the plurality of alerts.

8. The method of claim 7 further including:

for a first alert in the customer representative alert page, receiving a first status action input through the tracking template, indicating that a change in a status action has occurred for the first alert, and in response to the first status action input updating an action status for the first alert in the alerts database;

updating the customer representative alerts page to reflect the change in the status action for the first alert.

9. The method of claim 8 further including:

updating the alerts summary page to reflect the change in status action for the first alert.

10. The method of claim 7 further including: wherein the alerts included in the customer representative page includes at least a first level priority type of alert and a second level priority type of alert; and wherein the alerts included in the summary alerts page include the first level priority type of alert, but do not include the second level priority type of alert.

11. The method of claim 7 further including:

wherein the tracking template provided to the customer representative includes a plurality of predetermined status action fields which a customer representative can select from to update the status action for an alert.

12. The method of claim 11 wherein the plurality of predetermined status action fields includes at least the following status action fields: a closed-canceled status condition, a closed-unsuccessful status condition, a closed-no further action required status condition, and a closed-opportunity created status condition.

13. The method of claim 7 further including:

wherein the alerts summary page includes a first table which identifies a plurality of customer representatives supervised by the supervisor, and shows an action status for each of a plurality of alerts which have been generated for each of the plurality of the customer representatives.

14. The method of claim 13 further including:

wherein the alerts summary page includes a second table which identifies the plurality of customer representatives and shows corresponding alerts generated for each of the plurality of customer representatives.

15. A system for generating and managing alerts, the system including:

a plurality of customer representative computers coupled to a communication network;

an alerts tracking database which stores information for a plurality of alerts, the alerts tracking database providing a status action field for each of the plurality of alerts, and the status action field having one of a plurality of predetermined possible status conditions;

an alert computer coupled to the communication network, and in communication with the alerts tracking database, wherein the alert computer is programmed to include:

an alerts analyzer module which automatically generates alerts in response to analysis of customer data comprising customer account information, customer profile information, and market data; and an alert management module which manages the transmission of alerts to the plurality of customer representative computers, and manages and updates information in the alert tracking database, and the alert management module operates to provide a tracking template for use in a customer representative computer, and in response to an input by a customer representative, through a tracking template displayed on a display of customer representative computer, the alert management module operates to update status action information for an alert stored in the alert tracking database.

16. The system of claim 15 wherein the alerts analyzer module is further operable to generate alerts based on personal customer data, and market information.

17. The system of claim 15 wherein the tracking template provides for a plurality of predetermined possible status conditions, which a customer representative can select from to indicate a current status action for an alert.

18. The system of claim 17, wherein the plurality of predetermined possible status conditions provided for in the tracking template corresponds to the plurality of predetermined status conditions provided for in the alerts tracking database.

19. The system of claim 18 wherein the predetermined possible status conditions provided for in the tracking template include at least the following status conditions: a closed-canceled status condition, a closed-unsuccessful status condition, a closed-no further action required status condition, and a closed-opportunity status condition.

20. The method of claim 1, wherein the background information comprises data about the customer's under performing portfolio.

21. The method of claim 1, wherein the background information comprises data about a liquidation of the customer's portfolio value.

22. The method of claim 1, wherein the background information comprises data about a large deposit to the customer's portfolio.

* * * * *